Sept. 16, 1969   N. H. HACKETT   3,466,870
IN LINE BOOSTER

Filed Oct. 17, 1967   3 Sheets-Sheet 1

Norman H. Hackett
INVENTOR

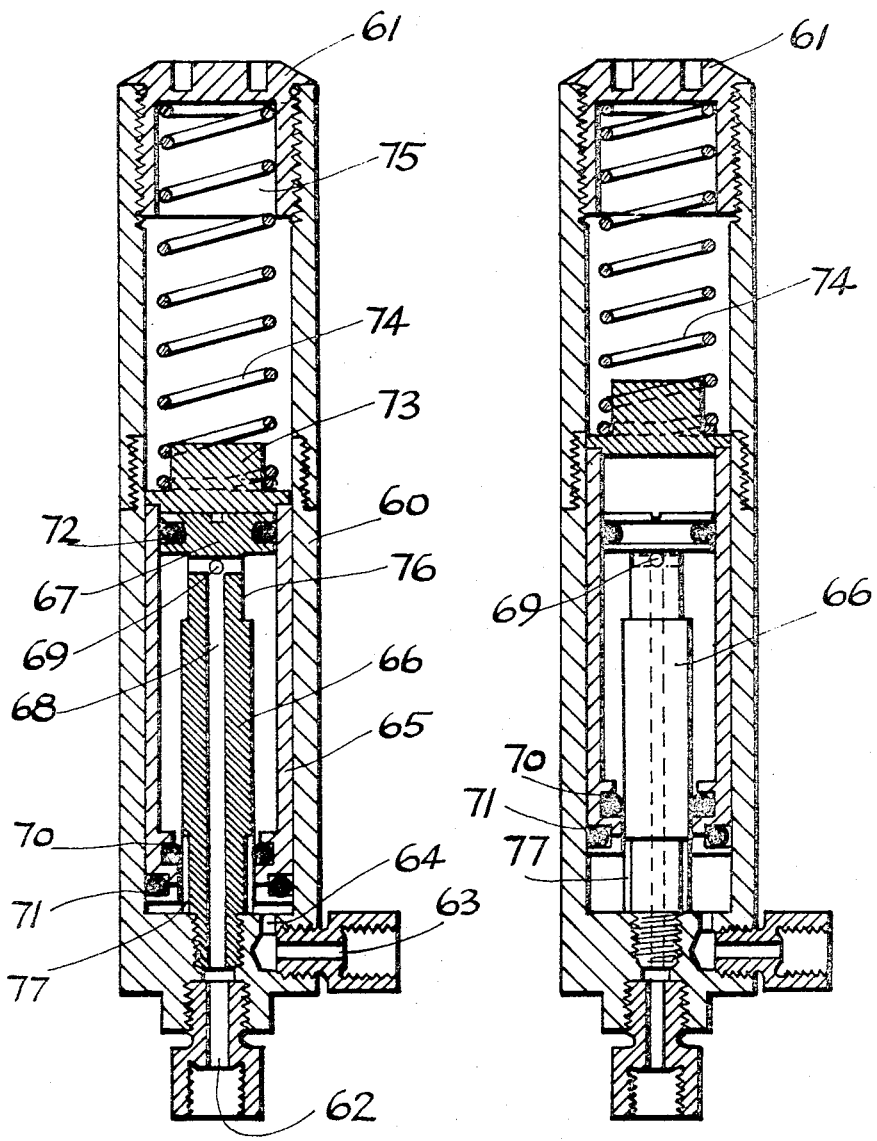

Norman H. Hackett
INVENTOR

United States Patent Office 3,466,870
Patented Sept. 16, 1969

3,466,870
IN LINE BOOSTER
Norman H. Hackett, Bondi, New South Wales, Australia, assignor of fifty percent to Roy J. Cochran, Los Angeles, Calif.
Filed Oct. 17, 1967, Ser. No. 675,922
Claims priority, application Australia, Oct. 17, 1966, 12,648/66
Int. Cl. F15b 3/00, 7/06
U.S. Cl. 60—54.5                    7 Claims

ABSTRACT OF THE DISCLOSURE

An in line booster of the type for use in the hydraulic brake systems of vehicles wherein the fluid pressure from the master cylinder is intensified and passed to the wheel cylinders, the booster having a piston with unequal working faces and arranged for reciprocating movement in a cylinder the piston having a passage from one face to the other with a valve member for sealing such passage, the valve passing fluid during the initial or bleeding stage, closing during the pressure intensification stage and releasing after a predetermined amount of piston travel or a predetermined maximum pressure.

This invention relates to in line boosters of the type used in vehicle hydraulic systems to increase the fluid pressure from the master cylinder to the wheel cylinder. High pressures obtained by the use of pressure multiplying devices are desirable to reduce driver fatigue and to increase braking efficiency. The present invention has been devised to provide a limit to the degree of pressure intensification so as to keep it within safe limits. The pressure requirements vary from vehicle to vehicle and from brake lining to brake lining and the instant invention has also been devised to permit simple adjustment of a standard unit to provide an in line booster having optimum characteristics for the selected application.

The present invention provides an in line booster having a fluid cylinder with a piston for reciprocating movement therein, the piston having two working faces of different effective areas, a fluid inlet in the cylinder to the larger working face and a fluid outlet in the cylinder from the smaller working face, a fluid path extending between the two faces and means for sealing said fluid path, said fluid path permitting fluid to pass from the inlet to the outlet side of the piston during the initial or bleeding stage of operation, the fluid path being closed during the pressure intensification stage and arranged to pass fluid from the inlet to the outlet side of the piston when the fluid pressure on the outlet side has reached a predetermined figure or the piston has travelled a predetermined distance.

The invention is hereinafter described by way of example with reference to the accompanying drawings in which:

FIGURE 4 is a cross-sectional view of a further embodiment of the invention;

FIGURE 5 is a cross-sectional view of the device of FIGURE 4 showing relative movement of certain elements thereof;

Figure 1:
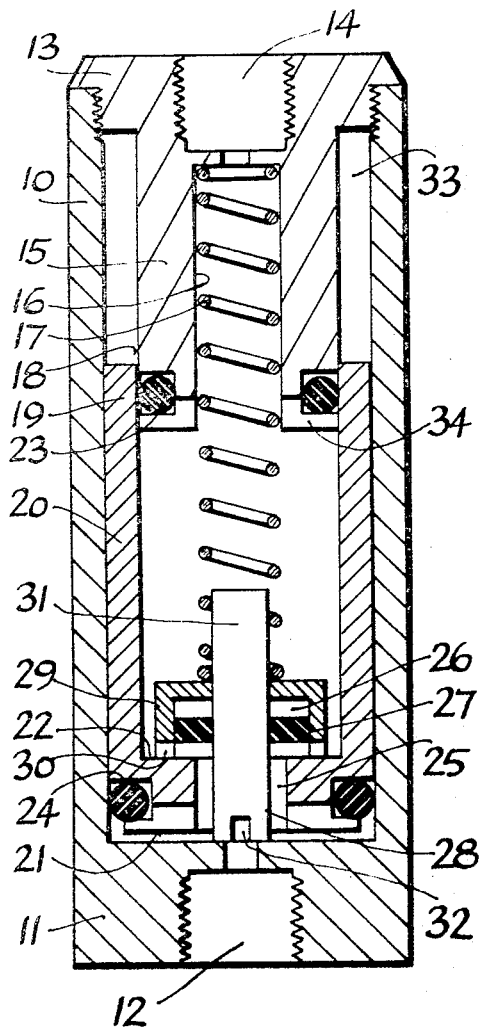
FIGURE 1 is a cross sectional view of one embodiment showing the parts in the initial or fluid bleeding position.

In the construction shown in FIGURE 1 there is a cylinder 10 having an inlet end 11 with a fluid inlet orifice 12. The outlet end is closed by a screwed in cap 13 which has an outlet orifice 14 and a projection 15, the bore 16 of which serves as a guide for a spring 17 and the periphery 18 acts as a guide for a piston 19 having a cylindrical portion 20 and opposed large and small working faces 21 and 22. Sealing members in the form of O rings are provided in grooves 23 and 24 on the periphery of both the projection 15 and piston 19.

The piston has a passage 25 passing from the working faces 21 and 22 and a valve 26 with a valve member having a sealing face 27 on the lower side thereof and valve stem 28 locating in the passage 25 serves to close same as hereinafter described. The movement of the valve member having the sealing face 27 along the stem 28 and thus off its seat, comprising the contiguous portion of the face 22, is limited by an inverted cup shaped member 29 which has orifices 30 through which fluid can pass into the interior of the piston. The cup member 29 is apertured for the through passage of an extension 31 of the valve stem 28 and this serves as a locating guide for the other end of spring 17.

In operation fluid passes through the orifice 12, initially through a bleed slot 32 in the stem 28, and then lifts the valve member provided with the sealing face 27 off its seat on the face 22, if it is not already so due to the spring 17 pushing the piston 19 to the inlet end by virtue of the spring urging the cup-shaped member 29 downwardly which causes the bottom of the stem 28 to contact the inner end of the piston.

When fluid has bled through into the cylinder and through the outlet and the system, after bleeding, is pressurised as with the application of brakes the system acts as a pressure intensifier due to the difference in the effective areas piston faces 21 and 22. This causes the piston to move against the restraining spring 17 with the valve member having the sealing face 27 closing the passage 25 and a point is reached where the difference in pressure is proportional to the difference in effective areas. A further build up of pressure at the inner end of the cylinder, for instance by increasing fluid pressure through the passage 25 causes the cup member 29 to engage the lower end of the projection 15 and thereafter the system operates without intensifying the pressure. This cut off point may be controlled by the characteristics of the spring 17 and/or by filling the space 33 between the projection 15 and the bore of the cylinder 10 with a fluid such as oil. Accordingly when the cylindrical portion 20 of the piston compresses such oil the piston cannot move any further and when the pressure on each side of the piston equalises the valve 26 lifts off its seat and the pressure differential is removed. When the cup member 29 contacts the lower end of projection 15 fluid passes around the cup member and through slots 34 in the lower end of the projection 15.

Figures 2, 3:
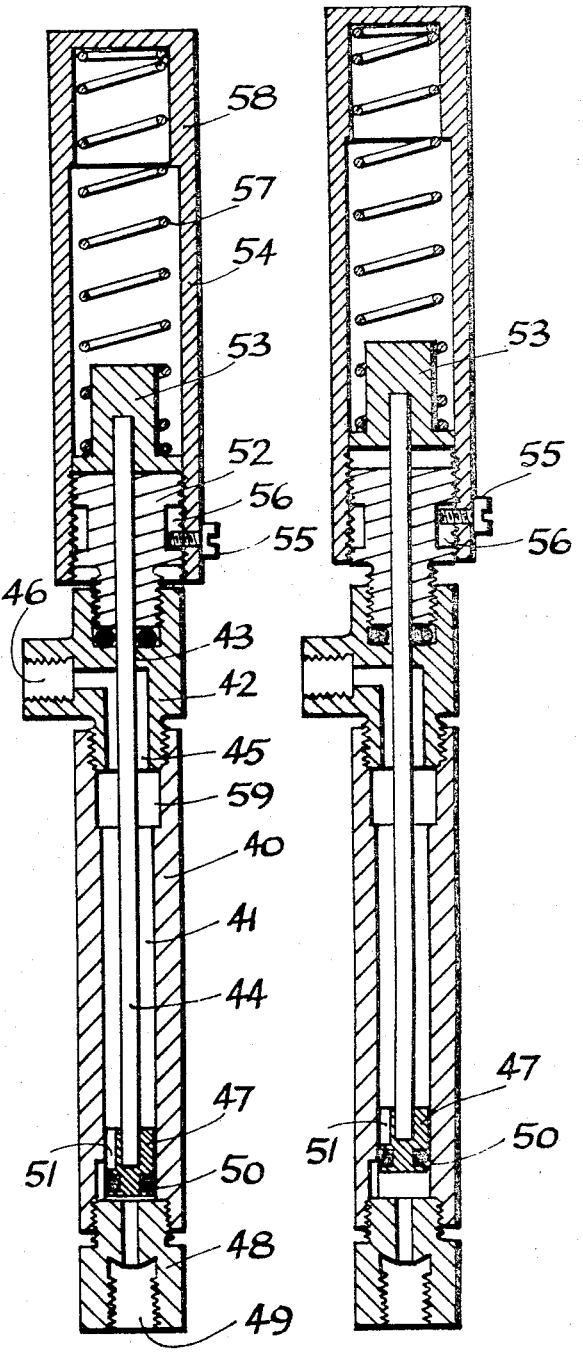
FIGURE 2 is a cross sectional view of another embodiment of the invention.
FIGURE 3 is a cross-sectional view of the device of FIGURE 2 showing relative movement between certain elements thereof.

In the construction in FIGURES 2 and 3 the cylinder 40 has an elongated bore 41 the top of which is capped by a plug 42 having a guideway 43 for a piston rod 44 and an outlet passage 45 passing into a radial outlet orifice 46. The piston rod 44 carries a piston 47 and the bottom or inlet end of the cylinder is closed by an inlet cap 48 having an inlet orifice 49. The piston 47 has near its lower end a peripheral groove 50 with an O ring sealing member therein. The piston has longitudinal grooves 51 which extend from the top end towards the O ring groove 50 and these permit the system to bleed oil past the piston when it is located at the inlet end as shown in FIGURE 1 and as hereinafter described.

The free end of the piston rod passes through the plug 42, through a control plug 52 and into a spring guide cap 53. A cover 54 is screwed onto the control plug 52 and these members may be moved relative to each other between an inner and an outer position defined by a set screw 55 in the cover 54 locating in a groove 56 in the control plug and compressing a spring 57 located in the cover, the upper end of the spring locating in a stepped housing 58 and the lower end on the spring guide cap 53.

The upper end of the bore has an abutment provided by the reduced diameter of the housing 58 and when the spring 57 has been compressed by the movement of the piston by fluid admitted through the inlet 49 the device acts as a fluid intensifier until the piston is displaced to the abutment provided by the housing portion 58 whereafter it acts without intensifying the pressure.

In the following constructions in line boosters are described where the inlet and outlet are positioned adjacent each other.

In FIGURES 4 and 5 an elongated cylinder 60 is provided with a spring guide cap 61 at its top end and an outlet orifice 62 at its lower end. A separate inlet orifice 63 is provided at the lower end with a passageway 64 into the bore of the cylinder. A piston 65 of elongated cylindrical form is mounted in the bore and around a post member 66 which carries a crown guide portion 67 on which the piston bore slides. The post member has a bore 68 with cross bore 69 communicating with the bore of the piston 65. The post member 66 is threaded into the outlet orifice 62 and its bore 68 forms the outlet from the piston bore. Sealing members are positioned in grooves 70 and 71 on the bore and periphery of the piston and 73 on periphery of the crown guide portion 67. The top end of the piston is capped by a spring guide plug 73 on which one end of a spring 74 is mounted. The other end of the spring locates in the stepped housing 75 of the spring guide cap 61.

The upper end of the post member 66 is provided with a reduced diameter portion 76 so that when the piston is displaced fluid can pass around the sealing member in groove 70. The characteristics of the movement of the piston are controlled by the type of spring 75, the presence of a dampening fluid in the spring housing and the size of the spring guide plug 73 which may have an adjustable portion to engage cooperating part of the spring guide cap 61. The lower end of the post member 66 is provided with a series of short longitudinal peripheral grooves 77 which pass fluid around the sealing member in groove 70 until pressure builds up in the bore of the piston which as in the previous constructions presents unequal fluid acting surfaces.

Figure 6:
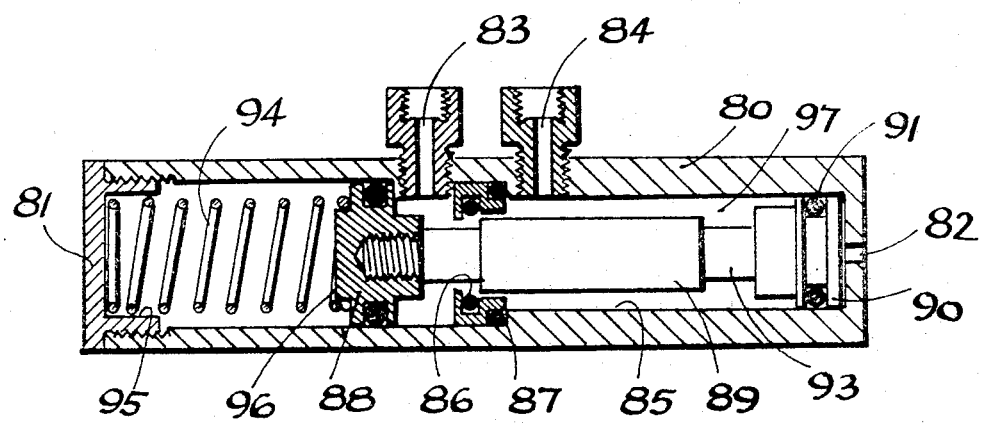
FIGURE 6 is a cross-sectional view of still another embodiment of the invention.
Figure 7:
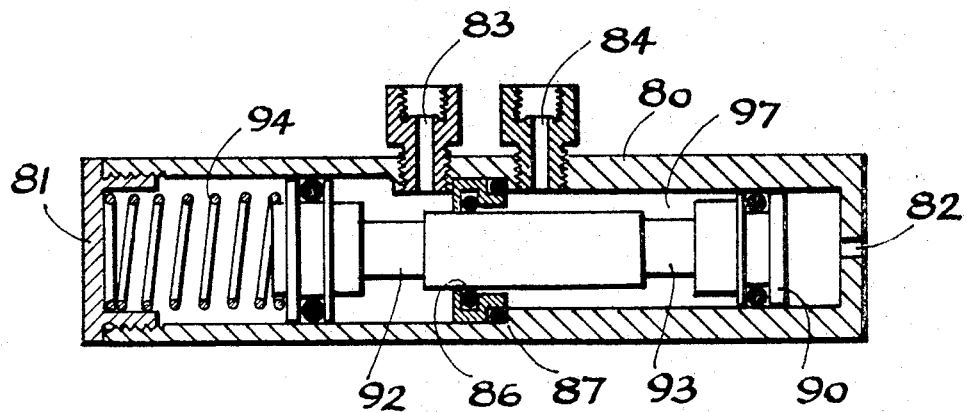
FIGURE 7 is a cross-sectional view of the device of FIGURE 6 showing relative movement of certain elements thereof.

In FIGURES 6 and 7 a cylinder 80 having a closure cap 81 at one end and an atmospheric bleed 82 at the other is provided with side by side and generally centrally disposed inlet and outlet orifices 83 and 84. The outlet end of the cylinder has a stepped bore 85 and a sealing ring having inner and outer sealing grooves 86 and 87 with sealing members therein is positioned between the inlet and outlet orifices 83 and 84.

A piston 88 having a piston rod 89 extending from its outlet end and a bore engaging portion 90 with sealing member and groove 91 at its atmospheric end. The piston rod has bleed and by-pass reduced diameter portions 92 and 93 at its piston and atmospheric ends respectively. As in previous constructions a restraining spring 94 acts on the piston 88 and both the cap 86 and piston 88 have portions 95 and 96 to locate such spring and to limit the movement of the piston. The piston on the application of fluid pressure moves against the spring and the fluid to the outlet 84 in space 97 is compressed by the bore engaging portion 90 of the piston rod which acts as a secondary piston of lesser effective area than the main piston 88.

I claim:
1. An in line booster having a fluid cylinder with a piston for reciprocating movement therein, the piston having two working faces of different effective areas, a fluid inlet in the cylinder to the larger working face and a fluid outlet in the cylinder from the smaller working face, a fluid path extending between the two faces of said piston and comprising a relieved portion therein and means for sealing said fluid path, said fluid path permitting fluid to pass from the inlet to the outlet side of the piston during the initial or bleeding stage of operation, the fluid path being closed during the pressure intensification stage and arranged to pass fluid from the inlet to the outlet side of the piston when the fluid pressure on the outlet side has reached a predetermined figure or the piston has travelled a predetermined distance.

2. An in line booster as claimed in claim 1 in which the fluid path extending between the two faces of said piston comprises a relieved portion comprising an aperture through the piston and the means for sealing said fluid path is a valve member concentric with said aperture.

3. An in line booster as claimed in claim 2 in which the piston is spring biassed by a spring towards the inlet end.

4. An in line booster as claimed in claim 1 in which the piston is displaceable between a bleeding position and an operating position and the fluid path extending between the two faces of said piston comprises a relieved portion comprising an enlarged bore portion in the cylinder juxtaposed the end of the operating stroke of the piston.

5. An in line booster as claimed in claim 1 in which the said fluid path being provided by reduced diameter portions of said piston adjacent both ends of said piston, and said means for sealing said fluid path being a ring sealingly engageable with the non-reduced diameter intermediate portion of said piston.

6. An in line booster as claimed in claim 1 in which the piston is a hollow cylinder and is slidably mounted in the cylinder, the piston sliding on a post member secured to the end of the cylinder at which the piston is urged by a restraining spring, the post member having a passageway passing from the interior of the piston to the outlet and a closure member at its free end in sealing and sliding engagement with the bore of the piston, the post member having a reduced diameter portion adjacent its attachment to the cylinder and adjacent the closure member defining said fluid paths around the piston.

7. An in line booster as claimed in claim 1 in which part of the piston as it is displaced enters a housing filled with a dampening fluid which prevents further movement of the piston and by increasing pressure on the inlet face of the piston causes a sealing member between the piston and the cylinder to be displaced off its seat to permit fluid to pass from the inlet side of the piston to the outlet side of the piston.

References Cited

UNITED STATES PATENTS 2,608,059    8/1952    Kux.
3,036,436    5/1962    Mitton.

MARTIN P. SCHWADRON, Primary Examiner

ROBERT R. BUNEVICH, Assistant Examiner